United States Patent [19]

Wagner et al.

[11] 3,880,784

[45] Apr. 29, 1975

[54] SOLUTIONS OF DIISOCYANATE POLYADDITION PRODUCTS WHICH CONTAIN FREE SEMIACETALS AND WHICH ARE STABLE IN STORAGE

[75] Inventors: Kuno Wagner, Leverkusen-Steinbuechel; Walter Schröer, Cologne, both of Germany

[73] Assignee: Bayer Aktiengesellschaft, Leverkusen, Germany

[22] Filed: Dec. 21, 1973

[21] Appl. No.: 427,290

[52] U.S. Cl. ........ 260/13; 260/31.2 N; 260/31.8 N; 260/32.6 N; 260/33.6 UB; 260/33.8 UB; 260/45.7 R; 260/45.95 P; 260/75 NA; 260/77.5 A; 260/77.5 SS; 260/77.5 MA; 260/859 PV
[51] Int. Cl............................................ C08g 22/04
[58] Field of Search............ 260/77.5 A, 77.5 SS, 260/77.5 MA, 45.7 R, 45.95 P, 75 NA, 13, 31.2 N, 31.8 N, 32.6 N, 32.8 N, 33.6 UB, 33.8 UB, 859 PV

[56] References Cited
UNITED STATES PATENTS

| | | | |
|---|---|---|---|
| 3,043,801 | 7/1962 | Wagner et al. | 260/841 |
| 3,142,699 | 7/1964 | Wagner et al. | 260/89.5 R |
| 3,472,802 | 10/1969 | Bownes et al. | 260/77.5 MA |
| 3,484,404 | 12/1969 | Collandeau et al. | 260/77.5 SS |
| 3,551,468 | 12/1970 | Chadwick | 260/77.5 SS |

*Primary Examiner*—M. J. Welsh
*Attorney, Agent, or Firm*—Gene Harsh

[57] ABSTRACT

Stable solutions of diisocyanate polyaddition products in a solvent mixture containing: (a) inert organic solvents, (b) primary and/or secondary alcohols and (c) semiacetals of formaldehyde and the process of preparing such solutions.

5 Claims, No Drawings

SOLUTIONS OF DIISOCYANATE POLYADDITION PRODUCTS WHICH CONTAIN FREE SEMIACETALS AND WHICH ARE STABLE IN STORAGE

This application relates to solutions of high-molecular weight diisocyanate polyaddition products which contain semiacetals of formaldehyde as methylolating agent and which are stable in storage.

It is known that various polymers which contain urethane or urea groups can be very readily methylolated with formaldehyde even in solution or converted into high-molecular weight cross-linked polycondensates (with formation of N-methylene or N-methylene ether segments) (see German Pat. No. 1,049,094 and German Pat. No. 1,063,375).

It has surprisingly been found, however, that solutions of various diisocyanate polyaddition products, e.g., polyester or polyether urethanes, polyester or polyether polyurethane polyureas, polyurethane-polyhydrazodicarbonamides, polyurethane-polyurea-polyhydrazodicarbonamides and polyurethane polyamides in mixtures of inert organic solvents and primary and/or secondary alcohols cannot be methylolated even if they contain groups which are usually extremely easily methylolated such as the following:

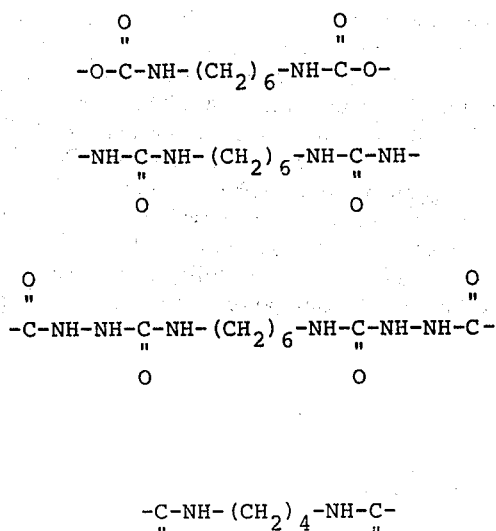

or

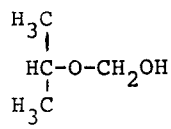

Polyurethanes or polyurethane polyureas which contain the above mentioned reactive groups can be heated under reflux with various semiacetals of formaldehyde, e.g., with $$\begin{array}{c} H_3C \\ | \\ HC-O-CH_2OH \\ | \\ H_3C \end{array}$$

for example in mixtures of aromatic compounds and primary or secondary alcohols (even in the presence of highly active N-methylolating catalysts such as sodium alcoholate, potassium alcoholate, potassium carbonate, dimethyl benzylamine, endoethylene piperazine, etc.) without methylolation of the high-molecular weight compound occurring to any significant extent. This effect, which is surprising in view of the known art, results in numerous unexpected advantages with regard to the application of such mixtures and their stability in storage, namely:

a. The stability of the solutions in storage is extremely high even if the solutions are permanently kept at temperatures of 50°–100°C.

b. The mixtures have excellent film-forming properties and flow properties when sprayed on substrates such as leather or textiles.

c. The light-fastness of the polymeric film-forming substances in the presence of white pigments such as titanium dioxide is much higher than that of polyurethane polyurea solutions of the same constitution which are free from semiacetals (see comparison Example 2c).

d. The addition of semiacetals greatly reduces the viscosity of solutions of polyester polyurethanes and polyester polyureas which have a high average molecular weight. The viscosity reducing effect is considerably greater than that of equivalent quantities of primary or secondary alcohols with the same chain length (e.g. $CH_3O—CH_2OH$ compared with $CH_3—CH_2—CH_2OH$) (see comparison Example 2). This effect of the semiacetals is presumably due to intramolecular saturation of potential hydrogen bridge bonds between the urethane or urea groups of the polymers, e.g., in accordance with the following formulae:

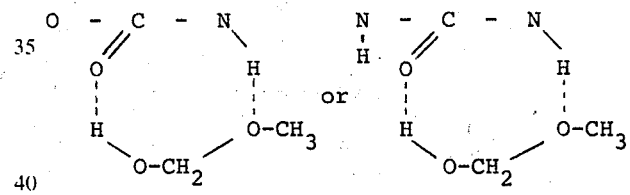

which is more efficient in semiacetals than in alcohols of the same chain length since each semiacetal molecule contains an oxygen atom in the α-position to the hydroxyl group. The formation of addition products between semiacetal and polymer reduces the intramolecular forces between the molecules of the chain. As a result, the solutions are easily sprayed, e.g., when used according to the invention as leather primers or as dressings for producing easy-care finishes on leather.

e. The complete inhibition of N-methylolation of the polymeric film-forming substance in the combination of solutions claimed according to the invention results in a constant formaldehyde-semiacetal concentration and hence the reactivity of the semiacetal (or of formaldehyde which is readily split off from it) towards basic amino groups of polypeptides, e.g., in gelatine, casein or leather, is preserved undiminished. When the low-molecular weight semiacetal is used for priming or dressing leather, it diffuses slightly into the leather or the leather primer, thereby improving the bond between the polymeric film-forming substance and its support.

An object of this invention is, therefore, solutions of high-molecular weight diisocyanate polyaddition products in mixtures of a. inert organic solvents;

b. primary and/or secondary alcohols; and
c. semiacetals of formaldehyde of the formula
$(HO)_p—R(—O—CH_2OH)_q$,
wherein R is a radical containing up to about 20 carbon atoms, having a valency of $(p + q)$ and being an aliphatic, cycloaliphatic, araliphatic or trialkylamine group or such a group substituted with alkylated nitrogen atoms and wherein $p$ and $q$ are integers, $(p + q)$ is from 1 to 6 and $p$ is from 0 to 3.

The primary or secondary alcohol being present in the mixture in a proportion of at least 25 percent by weight, based on the dissolved diisocyanate polyaddition product.

While the R component of the formula can be either saturated or unsaturated, it is found to be convenient to employ saturated compounds. It is also preferred to employ semiacetals wherein R is an aliphatic or trialkylamine radical, particularly such radicals containing up to about 10 carbon atoms, especially up to about 6 carbon atoms. Preferred semiacetals also include compounds wherein $(p + q)$ is from 1 to 4, particularly wherein $p$ is 0 or 1.

The invention also relates to a process for the preparation of the mixtures according to the invention, which is characterized in that solutions of diisocyanate polyaddition products in inert organc solvents which contain primary and/or secondary alcohols are mixed with semiacetals of formaldehyde at temperatures −20° to 130°C.

Lastly, the invention also relates to the use of the semiacetal-containing mixtures obtainable by the process according to the invention for the production of coatings, lacquers and impregnations, in particular for the production of leather dressings and for treating leather with easy-care finishes as well as for priming leather and for the production of wet-proof coatings, prints and impregnations on fibrous material.

The following are examples of semiacetals of formaldehyde which are suitable for preparing the mixtures according to the invention:

Some of these compounds are extremely low-viscosity liquids. They can easily be prepared from paraformaldehyde or gaseous formaldehyde and theh corresponding monoalcohols or polyalcohols by known methods. One preferred method of preparation of the semiacetals used according to the invention is described in U.S. Pat. No. 3,142,699, e.g., in Examples 1 to 3. Preferably, the semiacetals of formaldehyde employed are those made from methanol, ethanol, propanol, isopropanol, allyl alcohol, n-butanol, n-methyl diethanolamine, thiodiglycol, ethylene glycol, diethylene glycol, glycerol or trimethylolpropane.

The preferred diisocyanate polyaddition products for the mixtures according to the invention are polyester and polyether polyurethanes, polyester and polyether polyurethane polyureas, polyester and polyether polyurethane-polyhydrazodicarbonamides and polyester and polyether polyurethane-polyamides.

The solvent mixtures used according to the invention contain inert organic solvents such as esters, ketones, aromatic hydrocarbons, aliphatic and chlorinated hydrocarbons, dimethylformamide or dimethylacetamide. The solvent mixtures also contain primary and/or secondary alcohols, preferably $C_1$ to $C_7$ alcohols such as, for example, methanol, ethanol, propanol, isopropanol, isobutanol, ethylene glycol and ethylene glycol mono methyl-, ethyl- or butyl ether. The proportion by weight of inert solvents to alcohols should be between about 95:5 and about 5:95, peferably between about 90:10 and about 50:50.

To ensure that the reaction between the semiacetal and the NH-groups of the polyaddition product will be sufficiently inhibited, the proportion by weight of semiacetal to primary or secondary alcohol should be not more than about 4:1, but preferably is greater than about 1:40, the proportions used are preferably within the range of about 1:8 to about 1:30.

The semiacetals used according to the invention have excellent solubilizing power for the above mentioned

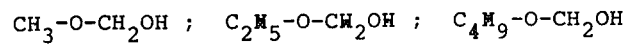

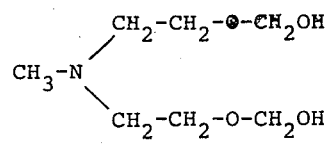

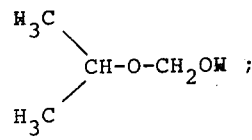

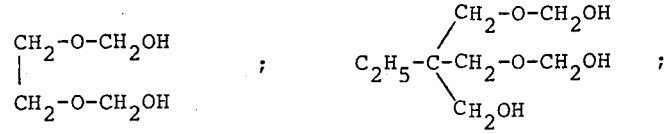

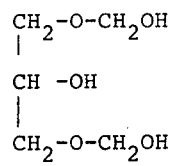

high-polymer polyaddition products and clear solutions which are stable in storage can, therefore, be obtained even when the semiacetals are added to a two-fold to three-fold excess of the polyurethanes. The preferred mixtures according to the invention contain from about 0.1 to about 10 and preferably from about 0.3 to about 1.5 R—O—CH$_2$ equivalents, based on each NH-equivalent of the polyaddition product (the NH-equivalents of the polymer are made up of the sum of urethane, urea, hydrazodicarbonamide and amide groups). The preferred polyaddition products generally contain about 0.2 – 0.4 gram equivalents of NH, resulting from urea groups, for every 200–300 g. of the polyaddition product.

The mixtures according to the invention generally contain a. approximately 5 to 60 percent by weight, preferably from about 10 to about 50 percent by weight of the polyaddition product, b. approximately 0.5 to 30 percent by weight, preferably from about 1 to about 15 percent by weight of the semiacetal, c. approximately 5 to 90 percent by weight, preferably from about 20 to about 80 percent by weight of a primary and/or secondary alcohol and d. approximately 5 to 90 percent by weight, preferably from about 20 to about 80 percent by weight of an inert organic solvent, but at the same time the proportions indicated above of semiacetal to alcohol and semiacetal to diisocyanate polyaddition product should also be observed.

Preparation of the high-molecular weight diisocyanate polyaddition products is carried out in known manner, preferably from α,107 -diisocyanate prepolymers based on higher molecular weight polyhydroxyl compounds, diisocyanates and chain-lengthening agents such as water, diamines, hydrazine, hydrazine hydrate, hydrazine derivatives, carbodihydrazide, etc., for example by the methods described in U.S. Pat. No. 3,087,912, U.S. Pat. No. 3,248,424, German Auslegeschrift No. 1,183,196, U.s. Pat. No. 3,184,426, German Auslegeschrift No. 1,184,947, German Auslegeschrift No. 1,184,984, German offenlegunsschrift No. 2,015,603 and German offenlegunsschrift No. 2,117,576. The polyaddition products have a molecular weight of about 15,000 to 180,000, preferably from 20,000 to 80,000.

Suitable higher molecular weight polyhydroxyl compounds for preparing the polyaddition products are in particular difunctional polyesters which contain terminal hydroxyl groups and which have a molecular weight of 400 to 8,000, preferably 800 to 2,500, difunctional polyethers which contain terminal hydroxyl groups and have a molecular weight of 400 to 8,000, preferably 800 to 2,500 and the corresponding dihydroxy polyacetals, dihydroxy polycarbonates, etc. Examples of such higher molecular weight dihydroxyl compounds which are well known in polyurethane chemistry may be found, inter alia, in Kunststoff-Handbuch Volume VII "Polyurethane," publishers Carl-Hanser, Munich (1966), pages 47 to 74.

Any aliphatic, cycloaliphatic, araliphatic or aromatic diisocyanates may be used for synthesizing the polyaddition products used according to the invention, for example, tetramethylene-1,4-diisocyanate, pentamethylene-1,5-diisocyanate, hexamethylene-1,6-diisocyanate, 2,4,4-trimethylhexamethylene-1,6-diisocyanate, dodecamethylene-1,12-diisocyanate, 1,2-diisocyanatomethyl-cyclobutane, dicyclohexyl-4,4'-diisocyanate, dicyclohexylmethane-4,4'-diisocyanate, p- and m-xylylene diisocyanate, lysine-methylester diisocyanate, 1-isocyanato-3,3,5-trimethyl-5-isocyanatomethyl cyclohexane, 1-methyl-2,4-diisocyanatocyclohexane and its isomers, tolylene-2,4-diisocyanate, tolylene-2,6-diisocyanate, 4,4'-diisocyanatodiphenylmethane, 4,4'-diisocyanatodiphenylether and naphthylene-1,5-diisocyanate. Isocyanate-containing telomers of these diisocyanates such as those described in French Patent Specification No. 1,593,137 are also suitable, especially those of hexamethylene diisocyanate and of 1-isocyanato-3,3,5-trimethyl-5-isocyanatomethyl-cyclohexane with vinyl acetate, vinyl chloride, styrene, methyl acrylate, methyl methacrylate and butyl acrylate. Diisocyanates which contain semicarbazide groups such as those mentioned in German Offenlegungsschrift No. 1,720,711 can be used, especially those obtained from 2 mols of hexamethylene diisocyanate or 1-isocyanato-3,3,5-trimethyl-5-isocyanatomethylcyclohexane and 1 mol of N,N-dimethyl hydrazine.

Both OH-functional and NH-functional compounds of the kind known in polyurethane chemistry can be used as chain lengthening agents, for example water or diols which have a molecular weight of 62 to 400 such as ethylene glycol, diethylene glycol, triethylene glycol, propane-1,3-diol, propane-1,2-diol, butane-1,4-diol, thiodiglycol, hexane-1,6-diol, octane-1,8-diol, dodecane-1,12-diol, 1,4-dimethylol benzene, etc; suitable hydrazines or diamines are, e.g., hydrazine hydrate, hydrazine, N-methyl hydrazine N,N-dimethyl- and -diethyl hydrazine, ethylenediamine, trimethylenediamine, 1,2-diaminopropane, tetramethylenediamine, N-methylpropylene-1,3-diamine, pentamethylenediamine, trimethyl hexamethylenediamine, hexamethylenediamine, octamethylenediamine, undecamethylene-diamine, diaminomethyl cyclobutane, 1,4-diaminocyclohexane, 1,4-diamino-dicyclohexylmethane, 1-methyl-2,4-diaminocyclohexane, 1-methyl-2,6-diaminocyclohexane, m-xylylenediamine, 1-amino-3,3,5-trimethyl-5-aminomethyl-cyclohexane, p-aminobenzylamine, 3-chloro-1,4-diaminobenzene, p-phenylenediamine, tolylene-2,4-diamine, 1,3,5-triisopropyl phenylene-2,4-diamine, 1,3,5-trimethyl phenylene-2,4-diamine, 1-methyl-3,5-diethyl phenylene-2,4-diamine, 1-methyl-3,5-diethyl phenylene-2,6-diamine, 4,4'-diaminodiphenylmethane and 4,4'-diaminodiphenylether. Particularly preferred hydrazines and amines are hydrazine hydrate, N,N-dimethyl hydrazine, 1-amino-3,5,5-aminomethyl-5-aminomethyl-cyclohexane, hexamethylenediamine, m-xylylenediamine, 4,4'-diamino-dicyclohexylmethane, lysine methyl ester, trimethyl hexamethylenediamine and 1-methyl-2,4-diaminocyclohexane.

It is often also advantageous to use lactam-activated chain lengthening agents in accordance with the process described in German Offenlegungsschrift No. 2,177,576.

These are mainly adducts of lactams and difunctional alcohols described in German Offenlegungsschrift No. 20,62,288 or the corresponding adducts of lactams and diamines or hydrazines. The reactivity of all these chain-lengthening agents with isocyanates is very substantially increased by the adduct formation.

The use of activated chain-lengthening agents, therefore, enable polyaddition products to be produced without the aid of catalysts and in particular without metal salts, such as tin-II or tin-IV salts, even if a very inert polyisocyanate is used, such as 1-isocyanato-3,3,5-trimethyl-5-isocyanatomethylcyclohexane,

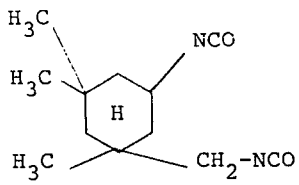

in which the NCO-group which is attached to the secondary carbon atom reacts much more slowly. The polyaddition products obtained, therefore, have improved resistance to ageing, hydrolysis and oxidation. If desired, however, the catalysts conventionally used in polyisocyanate chemistry such as tertiary organic bases, alkali metal salts or metal salts, etc. can be added to obtain an even faster polyaddition reaction. The following are mentioned as examples of such catalysts: dimethyl benzylamine, N-methyl imidazole, triethylenediamine, tin-II-octoate, tin-IV-dibutyl dilaurate and metal complexes of Co, Fe, Zn, Bi, Al, Cu or Ni with acetyl acetonates, ethyl acetate, etc.

As a rule, the lactam-activated chain-lengthening agents are advantageously low-viscosity liquids which are very highly soluble in numerous organic solvents, in polyisocyanates, in NCO-prepolymers and in the polyhydroxyl compounds commonly used for diisocyanate reactions so that a homogeneous reaction is ensured even during chain-lengthening, especially if the equivalent ratios of NCO to $NH_2$ or NCO to OH are kept within the preferred range of 0.9 to 1.1.

The polyaddition products used according to the invention are prepared as follows: prepolymers with terminal isocyanate groups are first prepared from the diisocyanates and higher molecular weight dihyroxyl compounds in known manner, using the reactants in such proportions that the NCO/OH ratio is between 1.5 and 2.3, preferably between 1.8 and 2. The prepolymers can then be reacted either solvent-free or in solution with the chain lengthening agents which contain OH or NH-groups at temperatures of −50° to 140°C, preferably 5° to 40°C. If desired, the higher molecular weight diisocyanate can be used together with a 1- to 6-times molar quantity of monomeric diisocyanates in the reaction with chain-lengthening agents which are dissolved, e.g., in solvent mixtures of inert aromatic compounds and (if the chain lengthening agents contain NH-groups) ethanol, isopropanol, n-butanol, isobutanol, benzyl alcohol, etc.

When preparing very high-molecular weight polyaddition products, it is preferred to use the NCO prepolymers and chain-lengthening agents in a molar ratio of 1:1. The chain-lengthening reaction is preferably carried out in the presence or organic solvents such as acetone, methyl ethyl ketone, methylene chloride, chloroform, perchloroethylene, dimethylformamide, methyl isopropyl ketone, benzene, toluene, xylene, ethyl acetate, butyl acetate, methyl glycol acetate, ethyl glycol acetate, tetrahydrofuran or (in the case of amino- functional chain-lengthening agents) in mixtures of these solvents, e.g., with ethanol, n-butanol, isopropanol, isobutanol, benzyl alcohol or glycol monoethyl ether.

The liquid semiacetals or semiacetals dissolved in inert organic solvents and/or primary or secondary alcohols are then added, observing the proportions indicated above.

Mixtures of polyaddition products and semiacetals which have been prepared by the process according to the invention from 1-isocyanato-3,3,5-trimethyl-5-isocyanatomethyl cyclohexane, m-xylylene diisocyanate, 4,4′-diisocyanato-dicyclohexyl methane, 2,6-diisocyanatocaproic acid esters or the vinyl telomers of these diisocyanates as isocyanate components and the diamines corresponding to these diisocyanates as chain-lengthening agents are particularly suitable for use as coatings for leather.

The semiacetal mixtures according to the invention are water-clear, have no tendency to gel formation, are stable in storage practically indefinitely and have the advantageous properties indicated above (low-viscosity; constant concentration of the methylolating agent). Even after 6 months' storage at room temperature, the formaldehyde is found to be undiminished in its reactivity with basic amino groups in polypeptides such as gelatine (see comparison experiment No. 3).

The mixtures according to the invention of semiacetals, alcohols and diisocyanate polyaddition products in addition have excellent light-fastness, high elasticity, very good film-forming properties and excellent adhesiveness, especially to leather. Although diisocyanate polyaddition products which contain aromatic groups are not very light-fast, their mixtures with semiacetals and alcohols obtainable by the process according to the invention are also very suitable, apart from this one disadvantage, for use as film-forming substances for the production of various coatings, primers and dressings.

Other compounds can also be added to the mixtures according to the invention to achieve special effects. For example, the solutions can be colored with dyes, e.g., inorganic or organic pigments, and the usual fillers and matting agents can be added, e.g., silicic acid, aluminium silicates, talcum, kieselguhr or metal salts of fatty acids.

One advantageous property of the mixtures according to the invention which should be particularly mentioned is their good compatibility with other film-forming substances. This enables the handle, surface hardness, abrasion resistance and other properties to be very easily varied by simply mixing the mixtures with other film-forming substances. Substances which are particularly suitable for this purpose are nitrocellulose, cellulose acetate, cellulose acetobutyrate and polyvinyl chloride copolymers. These additives can also contain the usual plasticizers. The handle of coatings produced from the mixtures according to the invention can be modified as desired by adding natural, semi-synthetic or synthetic low-molecular weight or high-molecular weight compounds such as caprolactam, natural or synthetic waxes, natural resins, polymers which are soluble in organic solvents, silicone oils, and alcohols which have a hydrocarbon chain of about 8–20 carbon atoms. The surface flow and wetting properties of the mixtures according to the invention can be controlled by the addition of the usual wetting agents.

If the above described combinations of polymer, solvent and semiacetal are used on their own, coating of substrates is carried out in either one or several applications. If several coats are applied, the first applications should be regarded as primers and can be adapted to the particular material used as support as regards the filling and sealing effect and the softness. This can be achieved mainly by varying the concentration of the solution. The final finishing coat is preferably applied with abrasion-resistant, harder polyurethanes although the desired abrasion resistance can also be obtained with the addition of hard, abrasion-resistant film-forming substances.

If desired, however, the mixture according to the invention can be used solely as primer or solely as finish. If used only as primer, the final application of dressing or finish can be carried out in the usual manner, e.g., in the case of leather with nitrocellulose or polyurethanes. The polyurethanes can be applied as two-component lacquers, in which case they are then cross-linked with isocyanates, or they can be applied in the form of NCO-prepolymers or as unreactive polyurethane coatings. If the mixtures according to the invention are only used as finishing dressings, the substrate can be primed in known manner, for example in the case of leather with the usual aqueous dressings or also with other dressings, e.g., those based on polyurethane.

The dressings used according to the invention are applied by the methods conventionally employed in the art for organic substances in solution, such as spraying with air spray guns or airless spray guns or casting with a casting machine or roller application or application with coating knives or by the reversal process. In the case of leather, a smoothing operation using rotary or hydraulic presses carried out between the coatings and at the end improves the smoothness and final finish of the products.

The individual applications can be dried at room temperature or by heating to about 180°C in drying chambers or drying channels. The quantities in which the preparations according to the invention are applied for coatings are normally between 5 and 50 g/m², depending on the absorbency of the substrate and the effect desired.

The following examples illustrate the wide range of variation of the invention.

EXAMPLE 1

A. Preparation of a liquid semiacetal analogous to German Pat. No. 1,092,002.

a. About 1,495 parts by weight of paraformaldehyde (49.8 mol) and 1,596 parts by weight of methanol (49.8 mol) are heated to about 70°C with vigorous stirring. As soon as the reaction temperature reaches 69°C, 10 parts by weight of 1 N-sodium hydroxide solution are added all at once to the suspension. The paraformaldehyde spontaneously depolymerizes. The semiacetal $CH_3-O-CH_2OH$ is obtained after filtration as a low-viscosity, water-clear liquid which is stable in storage.

b. About 60 parts by weight of paraformaldehyde are depolymerized with 0.4 parts by weight of 2 N-sodium hydroxide solution in 118 parts by weight of isopropanol in accordance with (a). After filtration, a low-viscosity, water-clear liquid which is stable in storage is obtained. It consists of the semiacetal

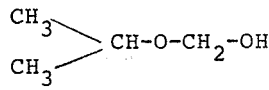

c. About 60 parts by weight of paraformaldehyde are depolymerized in 62 parts by weight of ethylene glycol in a manner analogous to (a). The semiacetal

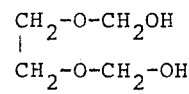

is obtained.

d. About 30 parts by weight of gaseous formaldehyde are introduced into 32 parts by weight of methanol. The semiacetal $CH_3O-CH_2OH$ described in (a) is obtained.

e. About 60 parts by weight of paraformaldehyde are depolymerized in 119 parts by weight of N-methyl-diethanolamine in a manner analogous to (a). The compound of the following formula

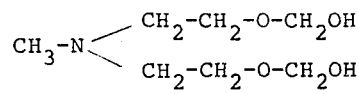

is obtained as a liquid which is stable in storage.

B. Preparation of a higher molecular weight diisocyanate (NCO prepolymer).

About 200 parts by weight (0.1 mol) of a polyester of adipic acid and ethylene glycol (OH-number 56) are dehydrated at 120°C for 30 minutes and then reacted with 44.4 parts by weight of 1-isocyanato-3,3,5-trimethyl-5-isocyanato-methylcyclohexane (0.2 mol) at this temperature for 30 minutes. The reaction product has an NCO-content of 3.4 percent.

C. Process according to the invention.

The temperature of the NCO prepolymer is left to drop to 100°C, the prepolymer is diluted with 500 parts by weight of xylene and the solution is cooled to 25°C. A solution of 16.3 parts by weight of 1-amino-3,3,5-trimethyl-5-aminomethyl cyclohexane in 230 parts by weight of xylene and 314 parts by weight of isopropanol is then added dropwise with stirring in the course of 20 minutes. Next, 30 parts by weight (0.48 mol) of the liquid semiacetal prepared from 1 mol of formaldehyde and 1 mol of methanol as described under A, (a) are added immediately after termination of the chain-lengthening reaction.

A water-clear solution of a polyurethane-polyurea which has a high-molecular weight solids content of about 19.6 percent by weight is obtained. It is completely free from gel particles and practically indefinitely stable in storage (it undergoes no change in the course of half a year either at room temperature or at 70°C). The solution has a viscosity of 575 cP at 25°C. The dissolved polyurethane-polyureas are not methylolated even in a 10-hours methylolation experiment carried out in the presence of 0.5 percent by weight of dimethyl benzylamine as catalyst. Even after storage for half a year, the free formaldehyde content determined by formaldehyde titration carried out by Lemme's method (Chem. Ztg. 27, 896 (1903); Chem. Zentralblatt (1903), II, 911) in accordance with the following schematic equation:

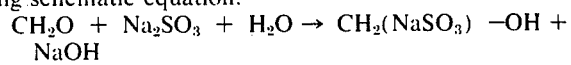

is found to be practically unchanged from its original value of 1.07 percent by weight.

$CH_2O$-content found: 1.062 percent by weight
theoretical $CH_2O$-content: 1.07 percent by weight.

Although in this example about 0.5 mol of formaldehyde are used for the sum of about 0.2 NH-equivalents from urethane groups and 0.4 NH-equivalents from urea groups in the polyaddition product (total: 0.6 NH-equivalents), the mixture according to the invention does not become methylolated even after a long time in storage and compared with a similar polyaddition product which does not contain semiacetals it has the advantages listed in Comparison Example 2.

EXAMPLE 2

(Comparison Example)

a. The procedure is the same as described under (B) and (C) above except that no $CH_3$—O—$CH_2OH$ is added. The resulting solution, which has a concentration of about 20 percent, has a viscosity of 850 cP at 25°C. The small quantity of semiacetal added to the polyurethane solution from Example 1 (C), which is only about 2.4 percent by weight, therefore reduces the viscosity by an absolute amount of 275 centipoises, which corresponds to a reduction of viscosity by about 32.5 percent compared with the solution which is free from semiacetal. The viscosity reducing effect of the semiacetal imparts to the products of the process an excellent consistency for spraying, e.g., when they are applied to leather as dressings to make them easy to look after.

b. The procedure is the same as described in Example 1 (C) except that the semiacetal $CH_3$—O—$CH_2OH$ (0.48 mol) is replaced by an equimolar quantity (28.8 parts by weight) of an alcohol of the same chain length ($CH_3$—$CH_2$—$CH_2$—OH). The original viscosity of 850 cP obtained without additive in comparison experiment (a) is thereby only reduced to 760 cP. The flow properties of the solution when used for spraying or foil casting are, therefore, substantially inferior to those of the product obtained in Example 1 (C).

c. Solutions obtained according to Example 1 (C) and comparison Example 2 (a) are pigmented with 15 percent by weight of titanium dioxide and cast on glass supports to produce films about 0.2 mm in thickness. After 14 days exposure to daylight, the films obtained from the mixtures according to the invention are completely colorless and pure white whereas films produced from the solution according to Example 2 (a) have a distinct yellow tinge.

EXAMPLE 3

This example demonstrates the undiminished reactivity of the masked formaldehyde contained in the mixtures according to the invention towards basic amino groups in high-molecular weight polypeptides, using gelatine as an example. An aqueous gelatine solution containing 8 percent by weight of commercial gelatine is first cast on a glass support to form a film about 0.2 mm in thickness which is left to dry over night at room temperature. The mixture according to the invention prepared in Example 1 (C) and after 6 months storage is then cast on this gelatine film to form a new film about 0.2 mm in thickness. The new film is left to dry at room temperature for 24 hours and the two layers of film are stored in water for several days. The 2-component film system remains completely intact, a sign that the lower gelatine layer has been completely crosslinked by formaldehyde and that the substrate, which is free from methylol groups, adheres firmly to this crosslinked gelatine layer. If the experiment is completed with a solution obtained according to Example 2 (a), which is free from semiacetal, and the film layers are kept in water, then the gelatine film becomes completely detached from the film of polyurethane-polyurea after only a short time because gelatine which is not crosslinked is readily soluble in water. The mixture according to the invention, therefore, adheres more firmly to polypeptide supports when cast on them to form films, a finding which is indirect evidence for the improved bonding of a primer according to the invention on leather supports or of a dressing according to the invention on a primer which contains a casein.

EXAMPLE 4

The procedure is carried out as described in Example 1 but the following chain-lengthening agents are used:

a. 13.6 parts by weight of m-xylylenediamine (0.1 mol)

b. 11.4 parts by weight of 4,4-diaminocyclohexane (0.1 mol)

c. 5 parts by weight of hydrazine hydrate (0.1 mol) and 0.48 mol of $C_2H_5$—O—$CH_2$—OH is added to the product of (a), 0.48 mol of

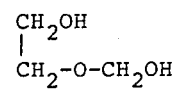

is added to the product of (b), and 0.6 mol of

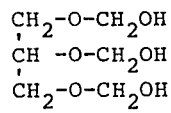

is added to the product of (c).

The resulting, approximately 19 percent solutions of high-molecular weight polyurethane-polyureas or polyurethane-polyhydrazodicarbonamides obtained, are again completely clear, practically indefinitely stable in storage and completely free from gel particles and have the following viscosities:

a. 950 centipoises/25°C.
b. 1,150 centipoises/25°C.
c. 930 centipoises/25°C.

If in each case 5 parts by weight of a biuret triisocyanate prepared from 3 mols of hexamethylene diisocyanate or 3 mols of 1-isocyanato-3,3,5-trimethyl-5-isocyanatomethyl-cyclohexane and 1 mol of water are added to 100 parts by weight of the high-molecular weight polyurethane-polyurea or polyurethane-polyurea-polyhydrazodicarbonamide solutions prepared in this example and the mixtures are rapidly stirred and then painted on glass, metal or wood supports, soft, abrasion-resistant lacquers or coatings which have maximum light-fastness are obtained.

EXAMPLE 5

The procedure is the same as described in Example 1 (C) but when preparing the starting material, the diisocyanate used is replaced by a. a mixture of 22.4 parts by weight of 1-isocyanato-3,3,5-trimethyl-5-isocyanatomethyl-cyclohexane and 16.8 parts by weight of hexamethylene diisocyanate, b. 37.6 parts by weight of m-xylylene diisocyanate, c. 42 parts by weight of trimethyl hexamethylene diisocyanate, d. 58 parts by weight of an isocyanato telomer prepared according to French Patent Specification No. 1,593,137 from hexamethylene diisocyanate and vinyl acetate, which telomer contains 40 percent by weight of grafted polyvinyl acetate and is dissolved in excess hexamethylene diisocyanate (NCO-content of the solution 29 percent by weight; hexamethylene diisocyanate content 58 percent by weight), e. a mixture of 25 parts by weight of 4,4'-diisocyanato-diphenylmethane and 22.4 parts by weight of 1-isocyanato-3,3,5-trimethyl-5-isocyanatomethyl-cyclohexane, or f. a mixture of 17.4 parts by weight of 1-methyl benzene-2,4-diisocyanate and 22.4 parts by weight of 1-isocyanato-3,3,5-trimethyl-5-isocyanatomethyl-cyclohexane.

Chain-lengthening is in all cases carried out with 16.5 parts by weight of 1-amino-3,3,5-trimethyl-5-aminomethyl-cyclohexane, using 500 parts by weight of dimethylformamide as solvent. Next, 0.48 mol (30 parts by weight) of liquid $CH_3—O—CH_2—OH$ is then added in each case. The solutions obtained are extremely stable in storage and have the following viscosities:

a. 850 cP/25°C.
b. 1,150 cP/25°C.
c. 980 cP/25°c.
d. 1,200 cP/25°C.
e. 1,250 cP/25°C.
f. 1,180 cP/25°C.

EXAMPLE 6

This example demonstrates that the mixtures according to the invention may also be prepared with extremely high concentrations of

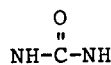

without premature cross-linking and without formation of gel particles taking place.

About 220 parts by weight (0.1 mol) of a polyester of adipic acid and butane-1,4-diol (OH-number 51) are reacted as in Example 1 (C) with 44.4 parts by weight of 1-isocyanato-3,3,5-trimethyl-5-isocyanatomethyl-cyclohexane (0.2 mol) to produce the $\alpha,\omega$-diisocyanato prepolymer which is then diluted with a solution of 44.4 parts by weight of 1-isocyanato-3,3,5-trimethyl-5-isocyanatomethyl-cyclohexane (0.2 mol) in 200 parts by weight of toluene at 95°C. The resulting solution contains about 0.1 mol of a macrodiisocyanate (NCO prepolymer) and about 0.2 mol of monomeric 1-isocyanato-3,3,5-trimethyl-5-isocyanatomethyl-cyclohexane. A mixture of 50 parts by weight of toluene, 720 parts by weight of isopropanol and 49.5 parts by weight of 1-amino-3,3,5-trimethyl-5-aminomethyl-cyclohexane is introduced into this NCO prepolymer solution in the course of 20 minutes with vigorous stirring and the solution is then immediately mixed with 62 parts by weight (1 mol) of $CH_3O—CH_2—OH$. The viscosity of the resulting solution, which has a concentration of about 20 percent, is 980 cP. The solution is completely free from gel particles. When 100 parts by weight of this solution are reacted with 5 parts by weight of trifunctional light-fast biuret polyisocyanates or urethane containing polyisocyanates of hexamethylene diisocyanate, 1-isocyanato-3,3,5-trimethyl-5-isocyanatomethyl-cyclohexane or 4,4'-diisocyanatocaproic acid methyl ester and the reaction product is cast to form films on supports made of wood, metal, textiles, leather or synthetic resins such as polyvinyl chloride, polyurethanes or polyesters, hard, cross-linked elastic lacquer coats, which have maximum light-fastness and good chemical resistance, are obtained which adhere firmly to their supports.

If the solutions from this Example 6, which contain relatively high concentrations of urea groups, are cast to form films, coatings, etc., without the addition of cross-linking agents, they are again found to form high-quality, light-fast films by virtue of the physical cross-linking reaction which takes place via hydrogen bridge bonds due to the presence of the urea groups, and the films obtained have a greatly reduced range of swelling in alcohols, perchloroethylene and trichloroethylene.

EXAMPLE 7

(Example of Practical Application on Leather)

A grained neat's leather vat-dyed with aniline dye and chrome-tanned is primed by spraying with a primer preparation composed of 150 parts by weight of the semiacetal-containing 20 percent polyurethane-polyurea solution described in Example 1 (C), 600 parts by weight of methyl ethyl ketone,
170 parts by weight of ethyl glycol and
80 parts by weight of toluene.

The following dressing is then applied by spraying to the primed aniline leather:

110 parts by weight of the 20 percent polyurethane-polyurea solution prepared according to Example 1 (C) which was used for priming, 80 parts by weight of a 10 percent solution of commercial estersoluble collodion cotton in ethyl acetate, which has a viscosity of 5,000 cP when prepared as a 10 percent solution in butyl acetate (purity 98/100 percent), 570 parts by weight of methyl ethyl ketone,
160 parts by weight of ethyl glycol and
80 parts by weight of toluene.

After a few minutes drying at 60°C, a coating with a silky gloss is obtained which does not impair the natural appearance of the dyed leather but reduces its sensitivity to wet and dirt. The addition of nitrocellulose to the dressing has the purpose of keeping the handle of the leather drier and improving the scuffing resistance. If the dressing is prepared in the same manner from the same products except that the semiacetal of methanol and formaldehyde is replaced by a molar quantity of n-propanol as in Example 2 (b), then the priming liquor does not penetrate the leather so well and the dressing liquor does not spray so evenly. If the comparable samples of leather are tested for their resistance when wet, the coating prepared with the addition of semiacetal is found to be superior. The wet resistance of the dressing was tested by placing the leather in water until it was completely soaked and then scratching it with a fingernail.

EXAMPLE 8

(Example of Practical Application)

A re-tanned chrome neat's leather is primed with an aqueous primer composition of 200 parts by weight of a commercial casein-containing leather covering dye which in addition to 55 percent of titanium dioxide and 6 percent of casein contains 18 percent of a plasticizer conventionally used for casein, 180 parts by weight of a commercial aqueous polymer dispersion containing 40 percent of a copolymer of butadiene and acrylonitrile, and 620 parts by weight of water using a plush pad followed by ironing at 70° and 150°C and another plush pad application of primer.

The dressing described in Example 7 is then applied to this primed leather by two light spraying applications. When a second leather is dressed in the same manner except that the semi-acetal in the dressing is replaced by the equivalent quantity of an alcohol, this leather is found to be inferior in its light-fastness and heat stability. In addition, the dressing which contains semiacetal is found to provide better resistance to scuffing than the dressing which is free from semiacetal and is bonded more firmly to the primer.

We claim:

1. A stable solution of a high-molecular weight diisocyanate polyaddition product in a solvent mixture, said solvent mixture comprising
   a. an inert organic solvent,
   b. an alcohol selected from the group consisting of primary and secondary alcohols, and
   c. a semiacetal of formaldehyde of the formula $$(HO)_p-R'-(O-CH_2OH)_q$$

wherein

R is a radical containing up to about 20 carbon atoms, having a valency of $(p + q)$ and being selected from the class consisting of aliphatic, cycloaliphatic, araliphatic and trialkylamine groups and such groups substituted with alkylated nitrogen atoms and wherein $p$ and $q$ are integers, $(p + q)$ is from 1 to 6, and $p$ is from 0 to 3, the alcohol being present in the mixture in a proportion of at least 25 percent by weight, based upon the dissolved diisocyanate polyaddition product.

2. A solution according to claim 1, characterized in that the diisocyanate polyaddition product is synthesized from an $\alpha,\omega$-dihydroxy polyester, a diisocyanate selected from the group consisting of aliphatic and cycloaliphatic diisocyanates and a compound selected from the group consisting of aliphatic and cycloaliphatic chain-lengthening agents.

3. The solution of claim 1 which also contains a film forming substance selected from the group consisting of cellulose acetate, cellulose acetobutyrate, nitrocellulose and polyvinylchloride copolymers.

4. A process for the preparation of solutions according to claim 1, characterized in that a solution of the diisocyanate polyaddition product in the inert organic solvent and the alcohol is mixed with the semiacetals of formaldehyde at −20° to 130°C.

5. The process according to claim 4, characterized in that the semiacetals of formaldehyde used are those of methanol, ethanol, propanol, isopropanol, allyl alcohol, n-butanol, N-methyl diethanolamine, thiodiglycol, ethylene glycol, diethylene glycol, glycerol or trimethylolpropane.

* * * * *